United States Patent [19]

Barnes et al.

[11] Patent Number: 4,750,862
[45] Date of Patent: Jun. 14, 1988

[54] MODULAR PROPELLER BLADE PITCH ACTUATION SYSTEM

[75] Inventors: Philip E. Barnes, West Hartford, Conn.; Edward H. Kusiak, Longmeadow, Mass.

[73] Assignee: United Technologies Corporation, Hartford, Conn.

[21] Appl. No.: 936,046

[22] Filed: Nov. 28, 1986

[51] Int. Cl.$^4$ .............................................. B64C 11/38
[52] U.S. Cl. ........................................ 416/46; 416/48; 416/157 R; 416/160; 416/165
[58] Field of Search ................... 415/129, 130; 416/46, 416/48, 153-157 R, 157 A, 165, 160

[56] References Cited

U.S. PATENT DOCUMENTS

| | | | |
|---|---|---|---|
| 2,124,078 | 7/1938 | Palmer et al. | 416/155 |
| 2,653,671 | 9/1953 | Martin et al. | 170/160.33 |
| 2,661,807 | 12/1953 | Fielding | 170/160.32 |
| 3,554,086 | 1/1971 | Wills | 91/376 |
| 3,663,119 | 5/1972 | Brooking et al. | 496/160 X |
| 3,720,060 | 3/1973 | Davies et al. | 416/157 A X |
| 3,801,219 | 4/1974 | Parsons et al. | 416/160 X |
| 3,895,884 | 7/1975 | Andrews | 416/153 |
| 3,900,274 | 8/1975 | Johnston et al. | 416/155 X |
| 3,901,626 | 8/1975 | McMurtry | 416/157 A |
| 3,942,911 | 3/1976 | Keenan et al. | 416/157 A |
| 3,994,128 | 11/1976 | Griswold et al. | 416/153 X |
| 4,061,440 | 12/1977 | Belliere | 416/167 X |
| 4,150,686 | 4/1979 | El Sherif et al. | 137/377 |
| 4,488,399 | 12/1984 | Robey et al. | 416/171 X |

FOREIGN PATENT DOCUMENTS

| | | |
|---|---|---|
| 505077 | 5/1939 | United Kingdom . |
| 541839 | 12/1941 | United Kingdom . |
| 567710 | 2/1945 | United Kingdom ......... 416/157 A |
| 590457 | 7/1947 | United Kingdom . |
| 886256 | 1/1962 | United Kingdom . |
| 1019749 | 2/1966 | United Kingdom . |
| 1232352 | 5/1971 | United Kingdom . |
| 1484683 | 9/1977 | United Kingdom . |

OTHER PUBLICATIONS

Examiner's Report to the Comptroller, 30 Dec. 1987.

Primary Examiner—Everette A. Powell, Jr.
Attorney, Agent, or Firm—Lloyd D. Doigan

[57] ABSTRACT

A modular, easily replaceable, pitch actuation system is removably secured within the hub of an aircraft. The modular system houses a driving system which provides a rotational output to set the pitch of propeller blades mounted to the hub, and a pitch changing system that controls the driving system. The driving system includes a high-speed, low-torque hydraulic motor that drives an harmonic drive to amplify the torque of the motor. The pitch changing system includes an actuator which positions a valve that controls the hydraulic motor, and a nulling gear which repositions the valve and acts as a pitch lock.

4 Claims, 5 Drawing Sheets

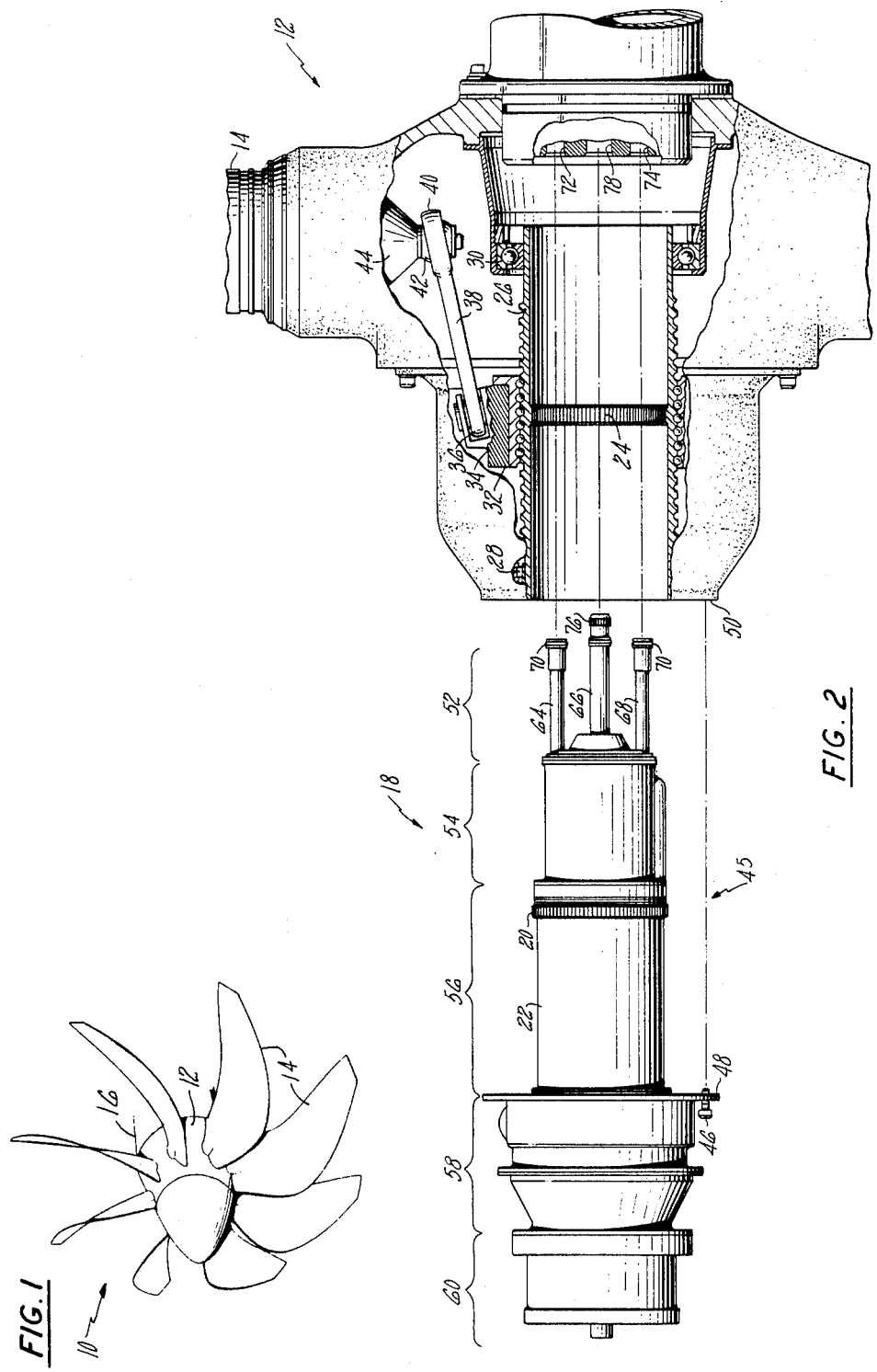

MODULAR PROPELLER BLADE PITCH ACTUATION SYSTEM

DESCRIPTION

1. Technical Field

This invention relates generally to aircraft propeller systems and more particularly to variable pitch propeller systems.

2. Background Art

Typically, variable pitch aircraft propeller systems include: a plurality of shaped propeller blades extending radially from a central hub a pitch actuating system housed within the hub connecting to the blades and, an engine for rotating the hub and propeller blades. The pitch actuation system pivots the propeller blades about their longitudinal axes to vary the angle (pitch) of the blades with respect to approaching air flow. Pitch actuation systems generally include a pitch lock. In the event of a malfunction of the pitch actuation system, the pitch lock prevents overspeed of the engine by preventing the blade from retarding to a lower pitch.

A pitch actuation system encounters severe operating forces. High centrifugal loads are encountered by the pitch actuation system as the hub rotates. High torquing loads are encountered by the pitch actuation system because the rotating shaped blades, which are connected to the actuation system, tend to twist in reaction to imparting momentum to the air and in reaction to the blade's own centrifugal twisting moment. As a result of the operating forces encountered by the pitch actuation system, routine maintenance, inspection, and servicing are required of the system to ensure the safety of the aircraft. In order to provide this servicing and maintenance, an aircraft may experience an amount of downtime.

DISCLOSURE OF THE INVENTION

According to the invention, a modular, easily replaceable pitch actuation system is removably secured within the hub of an aircraft. The pitch actuation system includes a removable housing that is secured to the hub and encloses a driving system to provide a rotational output to set the pitch of the propeller blade, and a pitch changing system that controls the driving system.

According to one aspect of the invention the driving system includes a high speed, low torque, hydraulic motor that drives an harmonic drive to amplify the torque of the rotational output of the driving system to set the pitch of the blades.

According to one aspect of the invention, the pitch changing system includes an actuator that positions a valve which controls the driving system, and has a gear mounted on the actuator that is connected to the rotational output of the driving system to reposition the actuator and the valve as the rotational output sets the pitch of the blade. The gear also functions as a pitch lock where, if the propeller blade moves undesirably toward low pitch, the gear, through its connection to the rotational output of the driving system which is moved by the propeller blade moving towards low pitch, is moved against a stop which prevents the propeller blade from moving further towards low pitch.

Other features and advantages of the present invention will be apparent from the specification and claims and from the accompanying drawings will illustrate embodiment of the invention.

BRIEF DESCRIPTION OF THE DRAWING

FIG. 1 is a partial cross sectional view of an aircraft propulsion system employing the modular pitch actuator system of the present invention;

FIG. 2 is a partial cross sectional view, partly broken away of the modular pitch actuation system of FIG. 1;

BEST MODE FOR CARRYING OUT THE INVENTION

Figure 3:
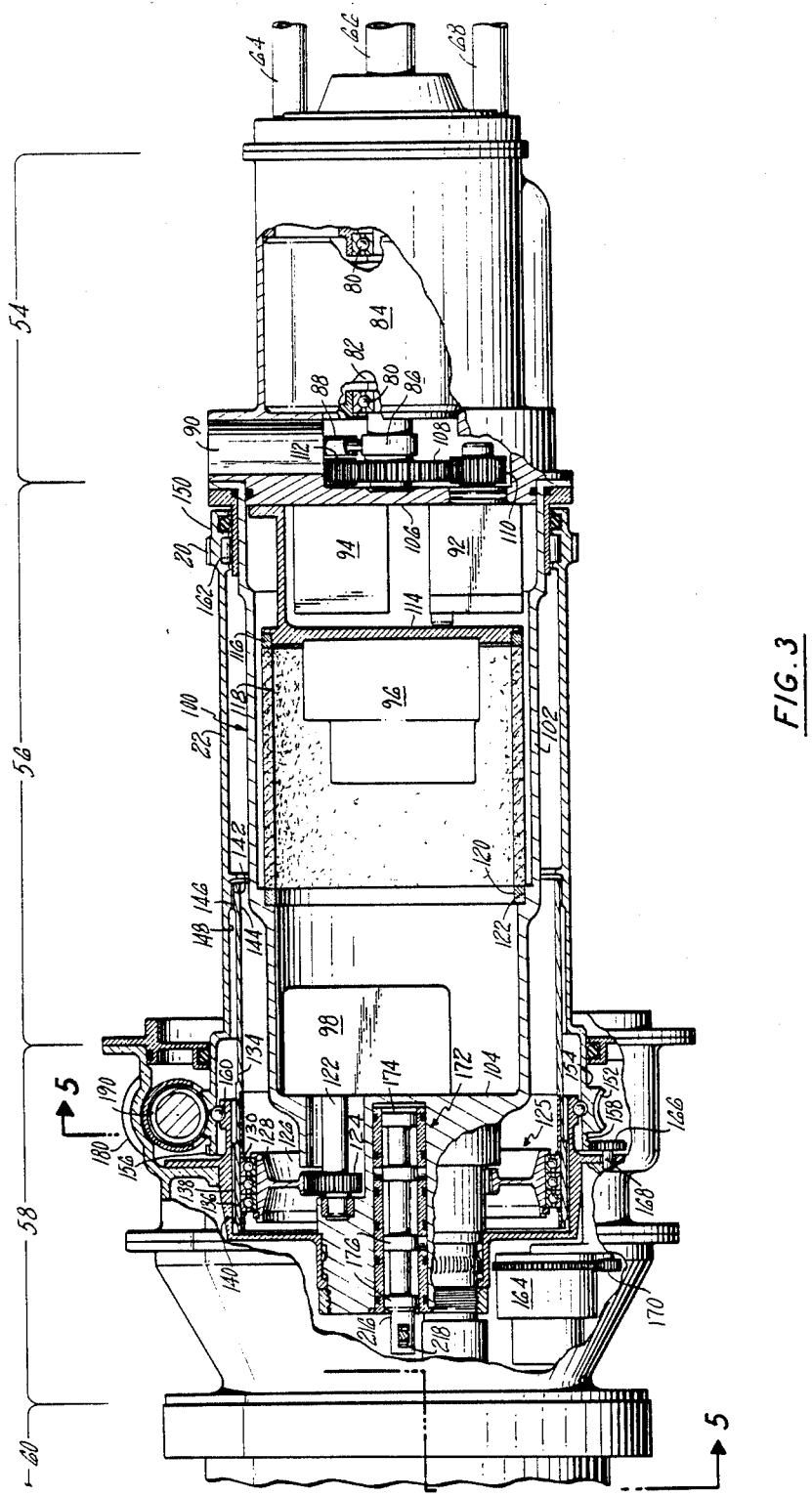
FIG. 3 is a partial cross sectional view of the pitch actuation system of FIG. 2.

This invention in its preferred form is adaptable for use in a prop fan propulsion system developed by the Hamilton Standard Division of the United Technologies Corporation. A prop fan propulsion system 10 as shown in FIG. 1, comprises a hub 12 having a plurality of variable pitch prop fan blades 14 depending therefrom. The hub is driven by turbine power plant (not shown) housed in a nacelle 16. While the invention is described herein with reference to a prop fan propulsion system, it should be understood, as will be obvious to one of ordinary skill in the art, that the invention has application for other variable pitch propeller systems.

Referring to FIG. 2, an embodiment of a modular pitch actuation system (hereinafter "module") 18 is shown disengaged from the hub 12 of the prop fan propulsion system 10. A splined surface 20 of an output cylinder 22 of the module is adapted to mate with a splined surface 24 on the interior of a ball screw 26. The ball screw is mounted for rotation relative to the hub by bearings 28, 30. A ball nut 32 is mounted for longitudinal motion upon the ball screw as is well known in the art. The ball nut has a radial projection 34 thereon that seats one end 36 of a connecting rod 38. The other end 40 of the connecting rod attaches to an eccentric pin 42 mounted to a root portion of the blade 44. The root portion of each blade is mounted to the hub 12 by bearings (not shown) which allow the blade to pivot about a longitudinal axis thereof. Rotation of the ball screw translates the ball nut by the output cylinder (as will be discussed infra) longitudinally which pushes or pulls the eccentric pin by means of the connecting rod thereby adjusting the pitch of the propeller blade. The module housing 45 is removably anchored to the hub by any suitable means such as the screws 46 (one of which is shown) which fasten a module housing flange 48 to a hub end face 50. The module housing is generally cylindrical, enclosing the module sections to fit within the hub 12.

The module has the following sections; an input section 52, a generator section 54, a power output section 56, a pitch lock and control section 58, and an electronic governor section 60.

The input section 52 of the module includes: a first oil line 64 for receiving cooling oil, an input shaft 66 for transmitting a rotational force from a gearbox (not shown) to power the module 18, and a second oil line 68 for removing oil from the module for cooling. The oil lines have fittings 70 which are designed to be removably inserted in a first and second hub socket 72, 74 without leakage. The input shaft has a splined surface 76 which is adapted to removably engage a quilled coupling in a third hub socket 78 (not shown). The quilled coupling transmits a rotational output from the gearbox to the input shaft.

Referring to FIG. 3, the details of the generator section 54, power output section 56, pitch lock and control section 58, and electronic governor section 60 are shown.

The input shaft 66 is supported within the generator section 54 by bearings 80. A rotor 82 is attached to the input shaft within a stator 84 such that rotation of the shaft produces electrical power as is well known in the art. An eccentric cam 86 is mounted about the input shaft and is in contact with a piston 88 that powers a scavenge pump 90.

A main pump 92, a standby pump 94, a valve pack 96, and a hydraulic motor 98 are all housed within a pressurized sump 100 that occupies a major interior portion of the power output section 56 of the module 18. The pressurized sump is defined by an internal housing 102 which is roughly cylindrical and has a closed end portion 104. The internal housing is sealed by a first bulkhead 106. The main pump and standby pump are mounted to the bulkhead 106 to receive the rotational input from an output gear 108 mounted on an outboard-most portion of the input shaft via idlers 110, 112 (see FIG. 6). For a typical application, each pump operates at about 15,000 revolutions per minute (RPM) and at about 3,000 pounds per square inch pressure (PSI). A second bulkhead 114 holds the valve pack 16 and one end 116 of a cylindrical filter 118. The second end 120 of the cylindrical filter attaches to a shoulder portion 122 internal housing. A high speed (typically 18,000 RPMs), low torque hydraulic motor 98 is mounted to the closed end portion 104 of the internal housing 102. High torque hydraulic motors are unsuitable for use in the module due to their relatively high weight and bulk.

Figure 4:
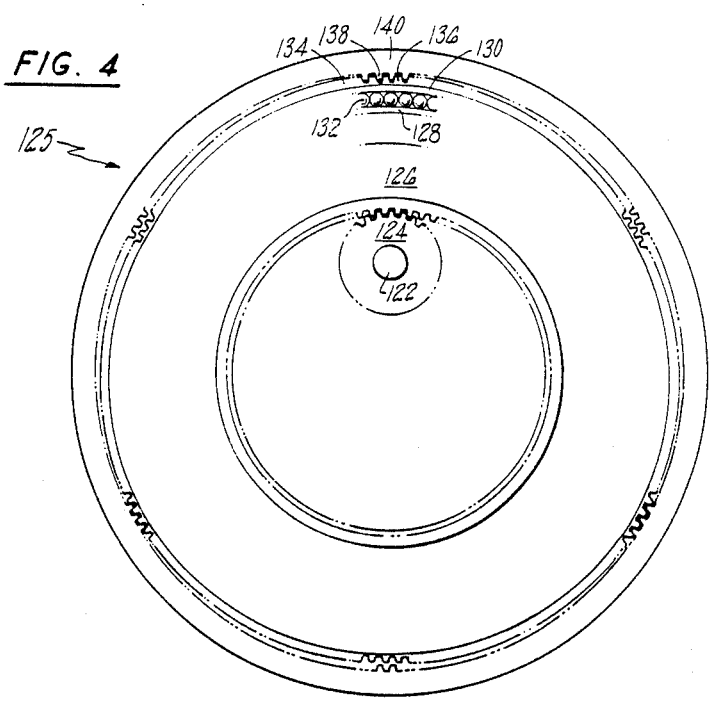
FIG. 4 is a partial cross sectional view showing the harmonic drive of the pitch actuation system of FIG. 3.

The hydraulic motor 98 provides a rotational output through a shaft 122 and a gear 124. Referring to FIGS. 3 and 4, a harmonic drive system 125 is shown. The gear 124 transmits the rotational output of the hydraulic motor to a three-lobed oval ring gear 126 ("wave generator"). The wave generator 126 closely bears against an inner bearing race 128 and applies pressure to an outer bearing race 130 via balls 132. The outer race is attached to a cylindrical flexible gear 134. The flexible gear has a plurality of external teeth 136 on an outboard portion thereof mating with teeth 138 of an internal ring gear 140 affixed to the module. There are a larger number of ring gear teeth than wave gear teeth such that rotation of the wave generator will result in rotation of the flexible gear at a reduced rate relative to the rotation of the wave generator as is well known in harmonic drives. The flexible gear rotates at a much lower speed and a much higher torque than the hydraulic motor to enable the module to set the pitch of the propellers against the forces encountered. Typically the ring gear has 600 teeth and the flexible gear has 597 teeth resulting in a speed reduction of approximately 200 to 1. The high speed, low torque hydraulic motor, in conjunction with the harmonic drive 125 provides a high torque to set propeller pitch. Moreover, the hydraulic motor and harmonic drive have low weight and bulk relative to a high torque hydraulic motor and are therefore ideal for use in a modular pitch actuation system.

Referring to FIG. 3, the rotation of the flexible gear 134 is transmitted via a splined section 142 on an inboard portion 144 thereof to a splined section 146 on the interior surface 148 of the output cylinder 22. The output cylinder, in turn, transmits rotation to the ball screw 26 via the splined surface 20 on an inboard end 150 thereof, to a worm wheel 152 on an outboard portion 154 thereof, and to a splined section 156 on an outboard-most portion 158 thereof as will be discussed infra. The output cylinder is mounted for rotation relative to the module via bearings 160, 162.

The splined section 156 on the outboard-most portion 158 of the output cylinder 22 attaches to a rotary variable displacement transducer (RVDT) 164 via a gear 166, a shaft 168, and a second gear 170.

A control valve 172 is disposed within an interior portion of the pitch lock and control section. The control valve, which consists of a spool 174 having lands 176, directs fluid directed from the pumps 92, 94 through the valve pack 96 to the hydraulic motor 98 controlling the rotational output thereof.

Figure 5:
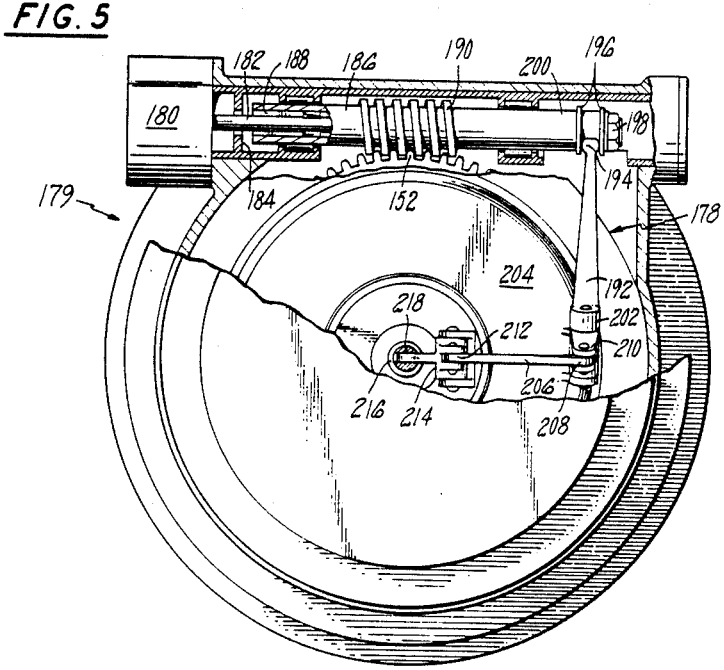
FIG. 5 is a partial cross-sectional view taken along the lines 5—5 of FIG. 3 showing a pitch changing system of the present invention.

Referring to FIG. 5, the control valve linkage 178 of pitch changing system 179 is shown. An electric motor 180 has a keyed output shaft 182. An abutment 184 surrounds the shaft as will be discussed infra. A hollow shaft 186 having a keyway 188 mates with the keyed shaft such that the hollow shaft rotates with the keyed output shaft but is able to move axially thereon. A worm gear 190 is formed integrally on the hollow shaft. The worm gear mates with the worm wheel 152 as will be discussed infra. A first linkage arm 192 has a first end 194 disposed between washers 196 by a nut 198 on an outer end portion 200 of the hollow shaft. The linkage arm has a mounting 202 attaching to an end plate 204 whereby axial movement of the hollow shaft causes the first linkage arm to pivot about the mounting. A second linkage arm 206 at one end 208 attaches to a second end 210 of the first linkage arm 192 and at the other end 212 to a rocker arm 214 which attaches to an outboard end 216 of the control valve 172 via a joint 218 (see also FIG. 3). Axial movement of the hollow shaft moves the control valve inboardly and outboardly within the interior portion to meter oil flow to the hydraulic motor.

Figure 6:
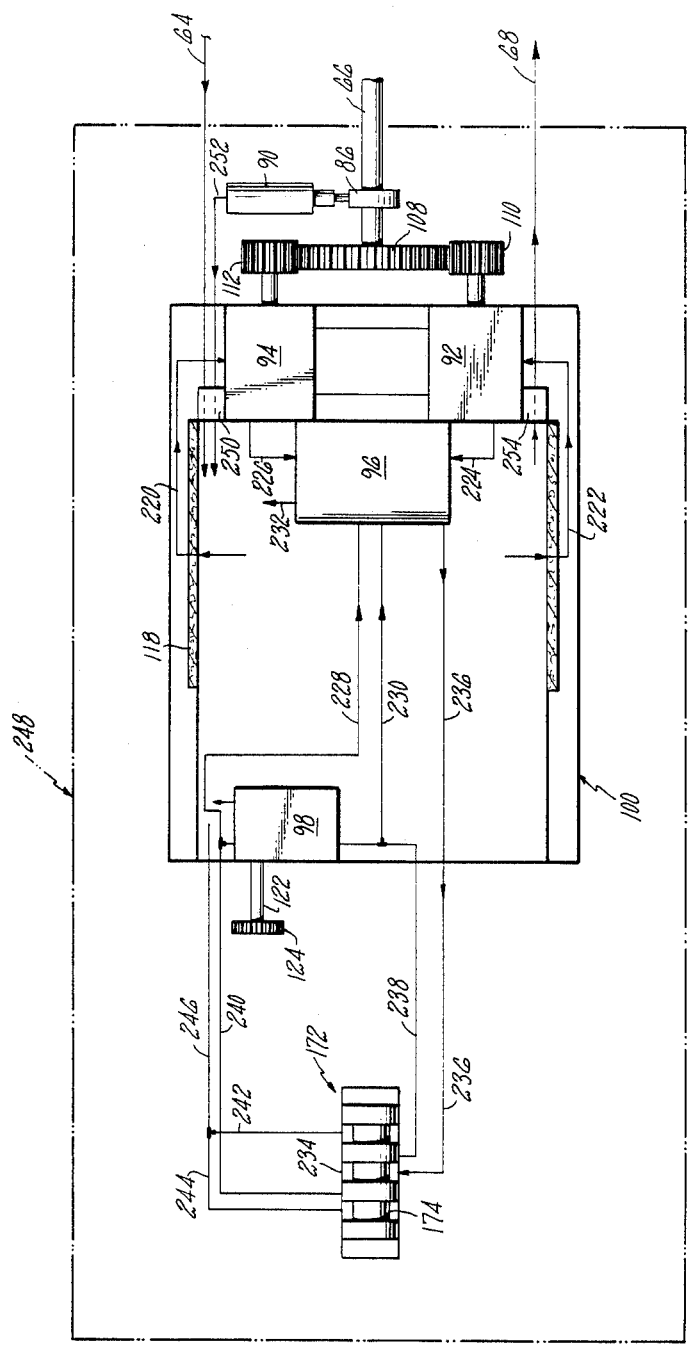
FIG. 6 is a schematic depiction of the hydraulic drive system of FIG. 3.

The flow of oil in the module is schematically shown in FIG. 6. Oil is drawn through the cylindrical filter 118 via line 220 to the standby pump 94 and via line 222 to the main pump 92. The pumps impel the oil to the valve pack 96 via lines 224, 226. The valve pack senses the amount of pressure required to change or maintain pitch of the propellers from the motors via lines 228, 230, and determines whether the output of the main pump is sufficient to change or maintain blade pitch or whether additional output is required from the standby pump as will be discussed infra. The valve pack dumps the output of the pumps not needed to change or maintain pitch back into the pressurized sump 100 via line 232. The output of the valve pack necessary to change or maintain pitch is directed to a central portion 234 of the control valve spool 174 via line 236. By manipulating the position of the spool 174, the lands 176 will direct the output via one of line 238 or line 240 to one side of the hydraulic motor 98 or the other to change the pitch of the propeller blade 14 towards low or high pitch. The other of line 238 or line 240 returns the fluid to the valve for return back to the pressurized sump via lines 242, 244, 246.

Oil may leak from the control valve 172 or from the hydraulic motor 98 into an atmospheric sump 248 surrounding the pressurized sump 100. The leaked oil tends to form a centrifugal band (not shown) within the module 18. The scavenge pump 90 draws this oil back into the pressurized sump through a check valve 250 at approximately 75 psi via line 252. The scavenge pump serves to pressurize the sump to prevent oil from cavitating within the inlets (not shown) of each pump. Cooling oil is input to the pressurized sump through the check valve 250 to prevent back flow at about seven quarts per minute and at about 75 psi. Oil is released from the pressurized sump for cooling through a 75 psi pressure regulating valve 254 to return the oil to the gearbox for cooling.

Figure 7:
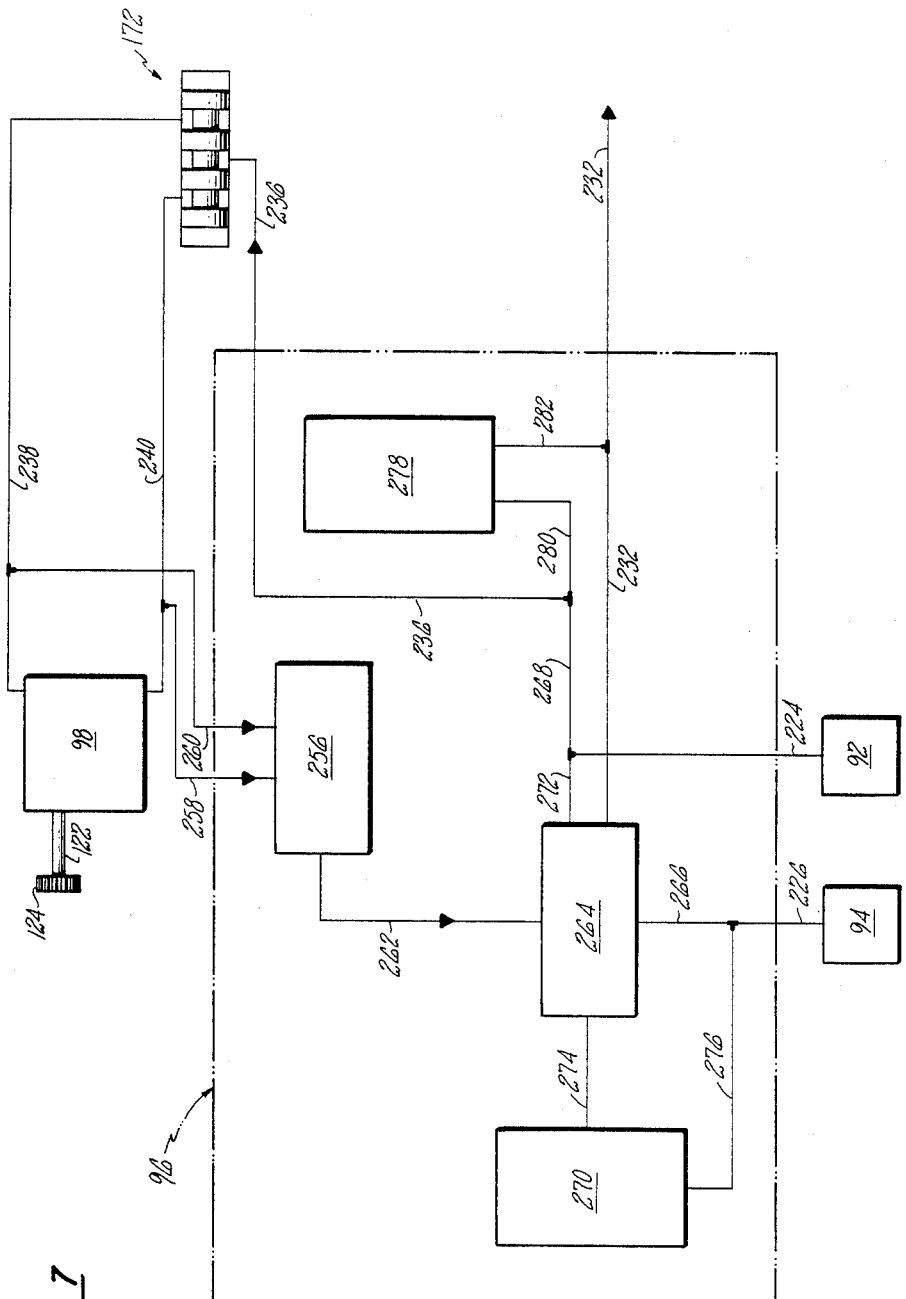
FIG. 7 is a schematic depiction of a valve pack of FIG. 3.

Referring to FIG. 7, the details of the valve pack are schematically shown. A "most" selector valve 256 attaches to the lines 238, 240 of the control valve 172 via lines 258 and 260 to monitor the pressure required by the hydraulic motor 98 to change or maintain the pitch of the propeller blades 14. The "most" selector valve communicates the pressure required to change or maintain pitch via line 262 to position a main and standby regulating ("main") valve 264. Under normal conditions where high oil flows are not required, the main valve is positioned to receive the output of the standby pump via lines 226 and 266 and dump the output back to the pressurized sump 100 via line 232. The main pump 92 delivers its output to the control valve via lines 224, 268 and 236. The main valve 264 communicates the pressure in lines 224, 268 and 236 to the standby check valve 270 via lines 272 and 274. Under large transient conditions where high oil flow is required, the "most" selector valve repositions the main valve 264 in response to changes in required pressure so that the output of the standby pump 94 no longer passes through line 266 to the main valve. The output of the standby pump is directed to the standby check valve 270 via line 276. The standby check valve allows the output of the standby pump to pass through the standby check valve, line 274, the main pump and line 272 to be added to lines 268 and 236 when the pressure in line 276 exceeds the pressure in line 274. A pressure regulating valve 278 senses the pressure in line 236 via line 280 and dumps the pump output to the pressurized sump via lines 282 and 232 if the pressure in line 236 exceeds a chosen value.

The electronic governor section 60 receives power from the generator section 54 via a power line (not shown), input from the RVDT as to the position of the blades and input from a cockpit (not shown), to send a signal to the electric motor.

In operation, a signal to set the pitch of the propeller blades is received by the electric motor 180 from the electronic governor section 60. The electric motor rotates the output shaft 180. Because the worm wheel 152 is stationary, the worm gear 190 mounted on the hollow shaft 186 induces the hollow shaft to move axially thereby setting the position of the control valve 172 through the linkage arms 192, 206, 214. The control valve then meters hydraulic fluid to one side of the motor or the other. The motor provides a rotational output to the wave generator 126 which in turn, through the driven flexible gear 134, provides a low speed, high torque output to adjust the pitch of the propeller blades 14. Since the output cylinder 22 is connected to the output of the flexible gear, the worm wheel 152 rotates with the flexible gear. The worm wheel moves the worm gear 190 and hollow shaft 186 to their initial position thereby nulling the control valve through the linkage arms 192, 206, 214 and stopping the propeller blade from further adjustment. Generally, the worm gear is not moving relative to the motion of the worm wheel and is therefore returned to its initial position. The rotation of the splined surface portion 158 on the outboard-most of the output cylinder 22 rotates the gear 166, shaft 168 and gear 170 connected to the RVDT 164 which produces a signal that is sent to the electronic governor section to indicate the position of the propeller blades 14. If the propeller blades are not at the proper position, a signal is fed to the electric motor 180 from the electronic governor section to continue setting the pitch of the propeller blade.

If the situation arises such that the propeller blade 14 begins to absorb external power, as opposed to imparting momentum to the air, a torque will ensue that will tend to move the propeller towards low pitch. As the propeller moves towards low pitch, the ball screw 26 is moved by the connecting rod 38 and the ball nut 32. The ball screw in turn rotates the output cylinder 22 via the splined sections 20, 24. Rotation of the output cylinder moves the worm wheel 152 which moves the worm gear 190 and the hollow shaft 186 axially. The propeller blades and the output cylinder will continue to move towards low pitch until the worm gear 190 abuts the abutment 184 thereby locking the propeller blades from moving towards low pitch.

By housing the pitch changing system within a readily replaceable module, aircraft downtime can be minimized. If a pitch changing system needs routine maintenance, inspection or servicing, the module is easily removed from the propeller hub. An identical module may then be inserted to replace the module needing attention. The aircraft downtime is then minimized as the module requiring attention may be serviced away from the aircraft.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. Apparatus for changing the pitch of a propeller blade mounted to a hub, said apparatus comprising:
    a housing removably disposed within said hub,
    driving means disposed with said housing for providing a high-torque rotational output to set the pitch of said propeller blade, said driving means comprising;
        means for providing a rotational input,
        an hydraulic pump for impelling fluid, said pump attaching to and driven by said means for providing a rotational input,
        a high-speed hydraulic motor driven by said fluid impelled by said hydraulic pump, said motor providing a low-torque rotational output, and
        harmonic drive means attaching to and driven by said hydraulic motor for amplifying said low-torque rotational output to provide said high-torque rotational output, and
    a valve disposed within said housing communicating with said fluid impelled by said pump for controlling a flow of said fluid to said hydraulic motor thereby controlling said high-torque rotational output, and actuator means disposed within said housing and attaching to said valve for controlling the position of the valve to control said high-torque rotational output, and attaching to said high-torque rotational output for nulling the position of said valve.

2. The apparatus of claim 1 wherein said actuator means further comprises:
lock means for stopping the high-torque rotational output from moving undesirably toward low pitch.

3. The apparatus of claim 1 wherein said actuator means comprises:
a linear actuator, a linkage attaching to said actuator and to said valve such that motion of the actuator positions the valve, and a gear means rotatably mounted upon said actuator and attaching to said high-torque rotational output such that motion of said high torque rotational output moves said gear, and said actuator and linkage thereby, such that said valve is nulled.

4. The apparatus of claim 3 wherein said lock means comprises: a stop upon said actuator which engages said gear means should said high-torque rotational output be moving undesirably towards low pitch.

* * * * *